United States Patent Office

3,439,013
Patented Apr. 15, 1969

3,439,013
PROCESS FOR THE PREPARATION OF LINEAR ORGANOPOLYSILOXANES
Jean Claude Delaval, Paul Alfred Eugene Guinet, and Jean Morel, Lyon, Rhone, France, assignors to Rhone-Poulenc S.A., Paris, France, a French body corporate
No Drawing. Filed Dec. 1, 1966, Ser. No. 598,225
Claims priority, application France, Dec. 7, 1965, 41,278
Int. Cl. C07f 7/18
U.S. Cl. 260—448.2                                      7 Claims This invention relates to the preparation of liquid linear organopolysiloxanes, more particularly linear organopolysiloxanes having a viscosity of less than 100 centistokes at 25° C.

It is known to prepare linear organopolysiloxanes by heating organosilicon compounds of low molecular weight in the presence of alkaline catalysts such as potassium hydroxide as an aqueous solution or as a silanolate. However, when it is desired to prepare organopolysiloxanes containing hydrogen atoms directly attached to silicon, this method is unfortunately inapplicable because the —SiH groupings react with the alkaline agents.

In view of this difficulty, it has been proposed to carry out the polymerisation, not in the presence of potassium hydroxide, but in the presence of mineral acids such as sulphuric acid [see Patnode, J. Amer. Chem. Soc. 68, 358 (1946)], but the sensitivity of certain groups such as the silicon-phenyl group in contact with acid agents [see Lewis, J. Amer. Chem. Soc. 70, 1115 (1948)] limits the field of application of such a process. Moreover, with these acid catalysts, the polymerisation is slow because it takes place in a heterogeneous medium. To accelerate it, it has been proposed to subject the reaction mixture simultaneously to the action of ultrasonic vibrations [see Kogan et al. J. Appl. Chem. USSR 35, 1328 (1962)], but it is difficult to carry out this process on an industrial scale.

The use of trialkylsilyl sulphates, as described in Japanese Patent No. 3,395/1957, and more particularly the use of trimethylsilyl sulphate (as described in German Patent No. 1,108,918), as catalyst does obviate the disadvantages due to the heterogeneity caused by sulphuric acid, but these catalysts introduce triorganosilyl groupings, such as trimethylsilyl, which act as chain limiters. This process is, therefore, unsatisfactory when it is desired to prepare linear organopolysiloxanes whose terminal silicon atoms carry hydrogen atoms, or groupings such as an alkenyl grouping, or in general any substituent other than the alkyl radicals introduced by such catalysts.

Linear tetrahydrogenoorganopolysiloxanes having two hydrogen atoms on each of the terminal silicon atoms of the chain have been described in French Patent No. 1,404,561. In order to prepare these compounds, a dihydrogeno-silane possessing a hydrolysable grouping having an acid or basic reaction is reacted with a linear diorganopolysiloxane, each end of which is terminated by a hydroxyl radical. This process yields very good results, but it is necessary in carrying it out to employ $\alpha,\omega$-dihydroxydiorganopolysiloxanes, which are generally obtained from very pure cyclic diorganopolysiloxanes, which themselves are obtained by rectification of the products of hyrolysis of diorganodichlorosilanes, followed by one or more crystallisations. Moreover, the molecular weight of the starting linear $\alpha$-$\omega$-dihydroxy-diorganopolysiloxane very narrowly determines that of the tetrahydrogenopolysiloxane to which it leads. Now, the preparation of $\alpha$-$\omega$-dihydroxylated diorganopolysiloxanes having a predetermined chain length is often rather uncertain, and it is therefore desirable to have available a process which, without being dependent upon these starting products, makes it possible to prepare linear organopolysiloxanes whose terminal silyl radicals may be the same or different and may contain atoms or groupings such as hydrogen or various hydrocarbon groups.

The present invention provides a new process for the preparation of linear organoploysiloxanes having a viscosity of less than 100 centistokes at 25° C. in which the aforesaid disadvantages are avoided or mitigated. More particularly, the new process does not exhibit any incompatibility either with the nature or with the position of the substituents of the silicon atoms, from which the previously described processes suffer.

The new process comprises contacting a cyclic organopolysiloxane, alone or in admixture with an $\alpha,\omega$-dihydroxy organopolysiloxane, with a monohalogenorganosilane in the presence of ferric chloride, and hydrolysing the product obtained.

The linear organopolysiloxanes produced by the new process may be represented by the following general formula:

$$R_3Si\text{—}O\text{—}[SiR^1R^2\text{—}O\text{—}]_n\text{—}SiR'_3 \qquad (I)$$

where R, R', R$^1$ and R$^2$ are each hydrogen or a saturated or olefinically or aromatically unsaturated substituted or unsubstituted hydrocarbon group and $n$ is 1 to 100. It will be understood that each unit —R$^1$R$^2$SiO— may be identical or different while each grouping R$_3$Si may be identical with each grouping R'$_3$Si and the symbols in each group R$_3$Si— or R'$_3$Si— may be identical or different.

The proportion of hydrogen atoms directly attached to silicon and of unsaturated and substituted radicals in the compounds of Formula I is preferably below 60% of the total number of atoms and radicals directly attached to silicon atoms and each of the terminal silicon atoms in the polysiloxane chain can at most carry only two hydrogen atoms.

Examples of monovalent hydrocarbon radicals which may be represented by R, R', R$^1$ and R$^2$ include alkyl radicals of from 1 to 4 carbon atoms, such as methyl, ethyl, or propyl, alkenyl radicals having from 2 to 4 carbon atoms, more particularly vinyl and allyl, saturated or monoethylenic alicyclic radicals having 5 or 6 carbon atoms, such as cyclopentyl, cyclohexyl, or cyclohexenyl, mononuclear aryl radicals, more particularly phenyl and phenyl substituted by lower alkyl, such as tolyl, xylyl or cumenyl, aralkyl radicals having mononuclear aryl nuclei, more particularly phenylalkyl radicals, such as benzyl or phenylethyl. The symbols R, R', R$^1$ and R$^2$ may also represent any monovalent hydrocarbon radical, such as one of the foregoing, in which one or more hydrogen atoms have been replaced by functional groupings or atoms which do not react, or substantially do not react, under the reaction conditions adopted for the preparation of the compounds of Formula I. Examples of functional groupings or atoms which may be present in R, R', R$^1$ and R$^2$ include halogen atoms, more especially chlorine and fluorine, and the cyano radical. Thus, R, R', R$^1$ and R$^2$ may represent radicals such as chloromethyl, trifluoropropyl, monochloro- or monofluoro-phenyl, trifluorotolyl, difluorochlorovinyl, chlorocyclohexyl, $\beta$-cyanoethyl or $\gamma$-cyanopropyl. Especially valuable compounds of Formula I are those in which R and R' are each hydrogen, alkyl of 1 to 4 carbon atoms, alkenyl of 2 to 4 carbon atoms, or cyanoalkyl of 2 to 5 carbon atoms, R$^1$ and R$^2$ are each alkyl of 1 to 4 carbon atoms or phenyl, X is chlorine, and $n$ is 4 to 40.

The compounds of Formula I are prepared by reacting a halogeno-organosilane of the formula:

$$R_3SiX \qquad (II)$$

where X represents halogen, more particularly chlorine, and R is as previously defined (alone or in admixture with a second halogeno-organosilane of the formula:

$$R'_3SiX \quad (III)$$

where R' and X are as previously defined) with a low viscosity organopolysiloxane (hereinafter called siloxane S) which is composed of cyclic organopolysiloxanes of the formula:

$$\text{\textendash}[OSiR^1R^2]_p\text{\textendash} \quad (IV)$$

in which $R^1$ and $R^2$ are as previously defined and $p$ represents an integer generally from 3 to 10, alone or in admixture with linear $\alpha,\omega$-dihydroxy-organopolysiloxanes consisting of units of the formula:

$$\text{\textendash}[OSiR^1R^2]\text{\textendash} \quad (V)$$

The compounds of the Formulae II and III in which X is chlorine are well known and their preparation is described in the literature.

The siloxanes S which may be employed in the process of the invention may be prepared by hydrolysis of organosilanes of the general formula:

$$R^1R^2SiY_2 \quad (VI)$$

in which $R^1$ and $R^2$ are as previously defined, and Y represents a hydrolysable atom or functional grouping, more particularly a halogen atom, e.g., chlorine. Many methods have been described for the hydrolysis of organosilanes of Formula VI, and especially for the hydrolysis of organodichlorosilanes. This hydrolysis leads to a mixture of cyclic organopolysiloxanes of Formula IV and linear organopolysiloxanes containing units of Formula V. The proportion of cyclic organopolysiloxanes in the mixture depends to a very large extent upon the conditions of hydrolysis. In the process of the present invention, this proportion is not critical, but it is generally preferred to operate with a siloxane S containing at least 60% of cyclic organopolysiloxanes. Such mixtures are readily obtainable when the hydrolysis of the organodichlorosilane is carried out under certain specific conditions. For example, the organodichlorosilane may first be diluted in ether, and the hydrolysis then carried out with a large excess of water. It is also possible, according to German Patent No. 888,851, to operate in the presence of a diluent miscible with water, such as tetrahydrofuran or dioxan. It is also possible for the organodichlorosilane simply to be continuously hydrolysed by the technique described in French Patent No. 1,077,230.

The siloxane S may be the hydrolysis product of a particular compound of Formula VI, or a mixture of products of the separate hydrolysis of different compounds of Formula VI, or a product obtained by simultaneous hydrolysis of a mixture of different compounds of Formula VI. A siloxane S enriched in cyclic polysiloxanes, for example by distillation, or a siloxane S consisting almost exclusively of cyclic polysiloxanes, or even a cyclic polysiloxane whose molecules are substantially all formed of polysiloxane cycles of the same size may also be employed. Such cyclic organopolysiloxanes may readily be obtained by rectification of the products of hydrolysis of organosilanes of Formula VI.

Although the compounds of Formula VI have hereinbefore been referred to as organosilanes, it is to be understood that this term also covers compounds such as dihalogenosilanes, more particularly the dichlorosilane of the formula $SiH_2Cl_2$, the use of which in admixture with true organosilanes for the production of the siloxanes S is also envisaged, the proportion of such dihalogenosilanes naturally being such that the proportion of hydrogen atoms directly attached to the silicon atoms in the desired product (I) satisfies the condition set out above.

The ferric chloride catalyst may be used in the anhydrous state or as a hydrate. Hexahydrated ferric chloride, which is that normally obtained by oxidising a solution of ferrous chloride with chlorine and subjecting it to crystallisation, may be employed with particular advantage. The quantity of this catalyst employed is not critical and may vary within fairly wide limits, for example in proportions from 0.1% to 5% by weight based on the siloxane S employed. Proportions between 0.5% and 2% are particularly suitable.

When the operation is carried out at low temperatures, it may be necessary to add to the siloxane S a compound which lowers its freezing point. On the other hand, since the siloxane S may be wet, notably when a crude hydrolysis product is used and since the use of hexahydrated ferric chloride also involves an addition of water, it is advantageous to eliminate the water thus introduced before the halogenosilanes of Formulae II and III are added to the siloxane S. In practice, these objects, i.e., lowering of the freezing point of the siloxane S and elimination of the water, may be readily achieved by adding to the siloxane S an appropriate quantity of organodihalogenosilane of the general formula:

$$R^1R^2SiX_2 \quad (VII)$$

in which X represents a halogen atom and $R^1$ and $R^2$ are as hereinbefore defined.

The proportion of halogenosilane of Formulae II and III which it is desirable to employ may be determined simply as a function of the nature and the molecular weight of the organopolysiloxane of Formula I which it is desired to obtain. Thus, to prepare an organopolysiloxane of the Formula I containing on average $(n+2)$ silicon atoms, and the terminal silyl groupings of which are identical $[R_3Si\text{\textemdash}=R'_3Si\text{\textemdash}]$ a quantity of halogenosilane of formula $R_3SiX$ is employed corresponding to 2 mol for each $n$ units of the formula:

$$[R^1R^2SiO]$$

supplied by the siloxane S employed or by the combination of siloxane S and dihalogenosilane of Formula VII when such a dihalogenosilane is employed.

On the other hand, to prepare an organopolysiloxane of Formula I containing on average $(n+2)$ silicon atoms having different terminal silyl groupings $[R_3Si\text{\textemdash}$ different from $R'_3Si\text{\textemdash}]$, there may be employed quantities of halogenosilanes of Formula II and III corresponding to 1 mol of each for each $n$ units of the formula:

$$[R^1R^2SiO]$$

supplied by the siloxane S employed, or by the combination of siloxane S and dihalogenosilane of Formula VII when such a dihalogenosilane is employed.

The new process comprises first reacting the siloxane S with the halogenosilane of Formula I and optionally the halogenosilane of Formula III, the proportions of the reactants being fixed in the manner already indicated. However, it is to be understood that the use of this term "reacting" does not necessarily imply that all the halogenosilane reacts, and some may remain until the hydrolysis phase.

In practice, the first phase of the new process is carried out as follows. The siloxane S, the catalyst and, where appropriate, the dihalogenosilane of Formula VII to eliminate the water and/or lower the freezing point of the medium, are mixed. The whole is then brought to the temperature chosen for carrying out the reaction with the halogenosilanes of Formula II and optionally III, and the halogenosilane(s) are then added with stirring in amounts depending upon the nature of the organopolysiloxane of Formula I which it is desired to prepare. Where a halogenosilane of Formula III is used, it may be added at the same time as the halogenosilane of Formula II, or preferably afterwards, so as to allow the latter sufficient time to react with the siloxane S. In this first phase, the temperature of the reaction medium may be maintained at a value between $-25°$ and $+30°$ C. When the addition of the halogenosilane of Formula II, and, where necessary, of Formula III, is complete, the mixture is generally left for several hours with stirring at a temperature within the aforesaid range, or even at a higher temperature, of the order of 30° to 75° C., more especially when the siloxane S contains aryl groupings.

When an organodihalogenosilane of Formula VII is employed, it may previously be reacted with hexahydrated ferric chloride, for example at ambient temperature (20–25° C.), a reaction accompanied by an evolution of hydrochloric acid, and the product thus obtained may be added to thte siloxane S.

The subsequent hydrolysis of the product of this first phase is generally carried out at or below ambient temperature (25–30° C.). The quantity of water which may be employed is not critical and may vary within very wide limits, for example between 1 and 15 times the weight of the compound of Formulae II and III (if any).

The organopolysiloxane oil thus obtained after hydrolysis is separated by decantation, and then washed, neutralised, dried and optionally treated in vacuo to remove volatile constituents optionally at elevated temperature.

The following examples illustrate the invention.

EXAMPLE 1

A dimethylpolysiloxane oil S is prepared by gradually and simultaneously introducing 1125 g. of dimethyldichlorosilane and 1950 g. of water into a circuit provided with a circulation pump. The oily layer obtained by continuous overflow is washed with water, dried over sodium carbonate and filtered. The oil obtained possesses a viscosity of 6.2 cst. at 20° C. and a hydroxyl group content of 0.46%. It contains 68.6% of cyclic dimethylpolysiloxanes distilling under reduced pressure (1 mm. Hg) at from 25° to 60° C.

Into a 3-litre round-bottomed flask provided with a stirrer, a reflux condenser, a double-jacketed dropping funnel and a thermometer tube are introduced 544 g. of of oil S, 12.6 g. of dimethyldichlorosilane and 4.4 g. of hexahydrated ferric chloride, and the mixture is cooled to −3° C. with stirring. 300 g. of monomethylmonochlorosilane previously cooled to −10° C. are then introduced through the dropping funnel in 35 minutes. The mixture is allowed to heat up to −2° C. for 3 hours 40 minutes, and then gradually hydrolysed with 950 g. of water at 4° C. so that the temperature does not exceed 25° C. The mixture ist stirred for 1 hour at ambient temperature (20° C.), and the oily layer is decanted and washed first with water and then with aqueous sodium bicarbonate solution. After filtration, volatile constituents are removed from the oil at 20° C. under reduced pressure (1 mm. Hg) under a nitrogen atmosphere.

719 g. of clear oil finally remain, having a viscosity of 2.12 cst. at 25° C., a density $d_4^{20}$=0.9212, and a content of hydrogen attached to silicon equal to 0.87%, which corresponds on average to the following formula:

$$CH_3-SiH_2-O[-Si(CH_3)_2-O]_{4.7}SiH_2-CH_3$$

EXAMPLE 2

The procedure of Example 1 is followed, but without adding any dimethyldichlorosilane to the siloxane oil S. 160 g. of siloxane oil S identical to that of Example 1, 1 g. of hexahydrated ferric chloride and 40 g. of monomethylmonochlorosilane are employed. The hydrolysis is carried out with 105 g. of water.

After treatment, 181 g. of clear oil remain, having a density of $d_4^{20}$=0.9400, a viscosity of 4.25 cst. at 25° C., and a content of hydrogen attached to silicon equal to 0.513%, which corresponds on average to the formula:

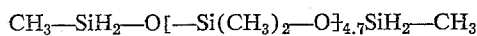

EXAMPLE 3

Into the same apparatus as in Example 1, 732 g. of siloxane oil S identical to that of Example 1, and 4.6 g. of hexahydrated ferric chloride are introduced, and the mixture is stirred for several minutes. 13.2 g. of dimethyldichlorosilane are then added and the mixture is stirred for 30 minutes while being cooled to 8° C. 161 g. of monomethylmonochlorosilane previously cooled to −10° C. are then introduced in 20 minutes and the mixture is subsequently worked-up as indicated in Example 1, the hydrolysis being carried out with 604 g. of water.

805 g. of oil are obtained, having a density of $d_4^{20}$=0.9406, and a viscosity equal to 4.43 cst. at 25° C. The percentage of hydrogen attached to silicon (0.47%) corresponds to a product having on average the formula:

$$CH_3-SiH_2-O[-Si(CH_3)_2-O]_{10}SiH_2-CH_3$$

EXAMPLE 4

The procedure indicated in Example 2 is followed, using 334.5 g. of siloxane S (without addition of dimethyldichlorosilane), 40 g. of monomethylmonochlorosilane, and 1.85 g. of hexahydrated ferric chloride, and the product obtained is hydrolysed with 75 g. of water. After working up, 342.5 g. of clear oil are obtained, having a density of $d_4^{20}$=0.9580 and a viscosity equal to 10.2 cst. at 25° C. The percentage of hydrogen attached to silicon (0.279%) corresponds to a product having on average the formula:

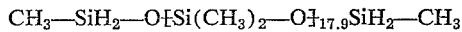

EXAMPLE 5

The procedure of Example 2 is followed, using 300 g. of siloxane S, 20 g. of monomethylmonochlorosilane and 1.6 g. of hexahydrated ferric chloride, the hydrolysis of the condensation product being carried out with 52 g. of water. After working up, 309 g. of oil are finally obtained, having the following characteristics: $d_4^{20}$=0.9665; viscosity at 25° C.=20.3 cst.; and percentage of hydrogen attached to silicon=0.157%, which corresponds to a product having on average the formula

EXAMPLE 6

The apparatus used consists of a double-jacketed 50-litre enamelled receptacle provided with a stirrer, a dipping tube, a thermometer and a reflux condenser cooled by a current of iced water. 25.2 kg. of a siloxane oil S, identical to that of Example 1, and 0.55 kg. of dimethyldichlorosilane are introduced into the vessel, and 190 g. of hexahydrated ferric chloride are gradually added. The mixture is stirred and cooled to 13° C. 2.555 g. of monomethylmonochlorosilane are then run in through the dipping tube in 7 hours at a regular rate, the circulation of iced water through the double jacket of the vessel being maintained. The stirring is continued for 15 hours more without cooling.

The mixture obtained above is run in 15 minutes into a double-jacketed 100-litre enamelled receptacle containing 26 kg. of water maintained between 15° C. and 22° C., and the mixture is stirred for 2 hours. After decantation, the oily layer is washed and dried and volatile constituents are removed. 25 kg. of oil are obtained, having $d_4^{20}$=0.959, and a percentage of hydrogen attached to silicon of 0.21%, which corresponds to a product having on average the formula:

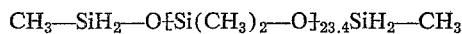

EXAMPLE 7

Into the apparatus employed in Example 1, 807 g. of octamethylcyclotetrasiloxane, 12.7 g. of dimethyldichlorosilane and 4.5 g. of hexahydrated ferric chloride are introduced, and the mixture is cooled to −5° C. with stirring. 85 g. of monomethylmonochlorosilane previously cooled to −10° C. are then introduced in 10 minutes through the dropping funnel. The mixture is allowed to heat up to 5° C., and 120 g. of trimethylchlorosilane are then added. After stirring for 4 hours, the final mixture is gradually introduced into 650 g. of water previously cooled to about 2° C. During the hydrolysis, the temperature rises to 8° C. The mixture is stirred for 1 hour at ambient temperature, and the oily layer is decanted and washed first with water and then with a 10% aqueous sodium bicarbonate solution. The oil is then dried by stirring with sodium sulphate and filtered. Volatile constituents are removed from the filtered product by heating under reduced pressure (20 mm. Hg) to 120° C. 812 g. of clear colourless oil finally remain, having a viscosity of 8.85 cst. at 25° C., a density $d_4^{20}=0.950$, and a percentage of hydrogen attached to the silicon equal to 0.21%, which corresponds on average to the formula:

$$(CH_3)_3Si\mathrm{-\!-\!O\!\!-\!\![Si(CH_3)_2\!-\!\!O]}_{10.7}SiH_2\mathrm{-\!-\!CH_3}$$

i.e., a mean molecular weight of 930 (the molecular weight obtained by cryoscopy in octamethylcyclotetrasiloxane is 890).

EXAMPLE 8

The procedure described in Example 7 is followed, 17 g. of monomethylmonochlorosilane being introduced into a mixture of 420 g. of octamethylcyclotetrasiloxane and 2.2 g. of hexahydrated ferric chloride. 24 g. of trimethylchlorosilane are then added and the mixture is hydrolysed with 350 g. of water as described in Example 7. After washing, filtration, drying and removal of volatile constituents, 382.5 g. of a clear oil finally remain, having $d_4^{20}=0.963$, and a viscosity at 25° C. of 21.8 cst. The percentage of hydrogen attached to the silicon (0.09%) corresponds to a product having the mean formula:

$$(CH_3)_3\mathrm{-\!-\!Si\!-\!O\!\!-\!\![Si(CH_3)_2\!-\!\!O]}_{2.8}SiH_2\mathrm{-\!-\!CH_3}$$

EXAMPLE 9

The procedure of Example 7 is followed using 623 g. of octamethylcyclotetrasiloxane, 10.5 g. of dimethyldichlorosilane, 3.6 g. of hexahydrate ferric chloride and 43 g. of monomethylmonochlorosilane, the trimethylchlorosilane being replaced by 50 g. of dimethylmonochlorosilane. The oily layer obtained after hydrolysis with 500 g. of water, decantation, washing and drying is heated to 120° C. under reduced pressure (20 mm. Hg) to remove volatile constituents. 634.4 g. of clear colourless oil finally remain, having a viscosity of 9.5 cst. at 25° C., a density $d_4^{20}=0.953$, and a percentage of hydrogen attached to silicon equal to 0.227%, which corresponds to a product of the average formula:

$$CH_3\mathrm{-\!-\!SiH_2\!-\!O\!\!-\!\![Si(CH_3)_2\!-\!\!O]}_{16.25}SiH(CH_3)_2$$

EXAMPLE 10

The procedure of Example 7 is followed, using 366 g. of octamethylcyclotetrasiloxane, 11.85 g. of dimethyldichlorosilane and 2.76 g. of hexahydrated ferric chloride. To this mixture 20.3 g. of dimethylmonochlorosilane and 17.8 g. of monomethylmonochlorosilane are added. After the reaction, the product obtained is hydrolysed by pouring into 126 g. of water, and worked up as described in Example 7. An oil having a viscosity of 13.4 cst. at 25° C. is thus obtained, which has a percentage of hydrogen attached to silicon (0.163%) corresponding to the following average formula:

$$CH_3\mathrm{-\!-\!SiH_2\!\!-\!\![Si(CH_3)_2\!-\!\!O]}_{23.2}SiH(CH_3)_2$$

EXAMPLE 11

Into a 1-litre round-bottomed flask equipped as described in Example 1 are introduced 440.5 g. of octamethylcyclotetrasiloxane, 11 g. of dimethyldichlorosilane and 3.7 g. of hexahydrated ferric chloride. 55.1 g. of γ-cyanopropyldimethylchlorosilane are then introduced in 25 minutes with stirring, the temperature of the medium being maintained at about 15° C. One hour later, 43.4 g. of trimethylchlorosilane are added and the mixture is left for 4 hours with stirring, at the end of which time the temperature reaches 21.5° C. The mixture is then poured into 210 g. of water at 2° C., with agitation. At the end of 15 minutes, the oily layer is decanted, washed with a 10% aqueous sodium chloride solution, neutralised by stirring with sodium carbonate (10% calculated on the weight of the oil), and then filtered and dried over anhydrous sodium sulphate. 484 g. of clear oil finally remain, having a viscosity of 19.2 cst. at 25° C., a density $d_4^{20}=0.959$, a nitrogen content of 0.8% by weight, and corresponding on average to the formula:

$$NC(CH_2)_3\mathrm{-\!-\!Si(CH_3)_2\!-\!O\!\!-\!\![Si(CH_3)_2\!-\!\!O]}_{20.7}Si(CH_3)_3$$

This oil contains no volatile constituents distillable at 120° C. under reduced pressure (20 mm. Hg).

EXAMPLE 12

The procedure of Example 11 is followed, using 444 g. of dry octamethylcyclotetrasiloxane, 3.6 g. of hydrated ferric chloride, 43.4 g. of trimethylchlorosilane and 48.2 g. of vinyldimethylchlorosilane. Volatile constituents are removed from the oil obtained by heating at 120° C. under reduced pressure (20 mm. Hg), and 438 g. of a clear colourless oil finally remain, having a viscosity of 15.3 cst. at 25° C., a density $d_4^{20}=0.9532$, a vinyl group content of 2.1% by weight, and corresponding on average to the formula:

$$(CH_2\!\!=\!\!CH\mathrm{-\!-\!Si(CH_3)_2\!-\!O\!\!-\!\![Si(CH_3)_2\!-\!\!O]}_{15.4}Si(CH_3)_3$$

EXAMPLE 13

The procedure of Example 2 is followed using 38 g. of monomethylmonochlorosilane, and replacing the siloxane S by 297 g. of octamethylcyclotetrasiloxane and the hexahydrated ferric chloride by 2.73 g. of anhydrous ferric chloride. The product obtained is hydrolysed with 100 g. of water. After working up, a clear oil is obtained, having a density $d_4^{20}=0.958$, a viscosity of 9.15 cst. at 25° C., and a percentage of hydrogen attached to silicon of 0.282%, corresponding on average to the formula:

$$CH_3\mathrm{-\!-\!SiH_2\!-\!O\!\!-\!\![Si(CH_3)_2\!-\!\!O]}_{17.8}SiH_2\mathrm{-\!-\!CH_3}$$

EXAMPLE 14

A methylphenylpolysiloxane oil, hereinafter called oil P, is prepared by hydrolysing methylphenyldichlorosilane in accordance with the following technique. Into a 10-litre round-bottomed glass flask provided with a stirrer, a dropping funnel, a thermometer tube and a gas delivery tube connected to a system for the entrainment and neutralisation of the hydrogen chloride formed, 4950 g. of water are introduced, and 1910 g. of methylphenyldichlorosilane (10 mol) are added thereto through the dropping funnel at a rate such that the temperature does not exceed 75° C. in the reaction mass. When the chlorosilane has been completely run in, 2 litres of water are added all at once and stirring is continued for 15 minutes, the mixture is then decanted, the upper aqueous layer is eliminated, and the lower polysiloxane layer is treated with 34 g. of sodium carbonate at a temperature of 80–90° C. for 15 minutes. 68 g. of anhydrous sodium sulphate are then added and the product is filtered through filtering earth at elevated temperature (60–70° C.). 1332 g. of colourless oil are thus obtained, having a viscosity at 20° C. of 700 cst., $n_D^{20}=1.5482$, and $d_4^{20}=1.131$.

Into a 3-litre round-bottomed flask equipped as described in Example 1, are introduced 164.8 g. of siloxane S, 367.2 g. of the aforesaid oil P, and the product of reaction of 61 g. of dimethyldichlorosilane with 4.26 g. of hexahydrated ferric chloride (this reaction product is obtained by stirring the two reactants at ambient temperature for about 20 minutes, in the course of which stirring evolution of hydrogen chloride and the formation of a blackish precipitate occur). Into the stirred mixture, 61.9 g. of dimethylchlorohydrogenosilane are introduced in 30 minutes, with the aid of the dropping funnel, and the temperature of the mass is maintained at about 20–25° C. during this period. When the running-in has been completed, stirring is continued for 4 hours, while the temperature of the mass is gradually raised to about 50° C. 860° g. of water are then added in 45 minutes, the temperature of the mixture being maintained at about 20°

C. during this addition. The mixture is stirred for 1 hour more after the end of the running-in. 1250 ml. of diethyl ether are introduced, and the ethereal layer is separated and treated successively with salt solution, aqueous sodium bicarbonate solution, pure water and finally anhydrous sodium sulphate to dry it. After elimination of the ether, 560 g. of a clear oil are obtained, having a viscosity of 90 cst. at 25° C., a density $d_4^{20}$ of 1.059, an index $n_D^{20}$ of 1.4824, and a percentage of hydrogen attached to silicon equal to 0.1%, which corresponds on average to the formula:

$$(CH_3)_2SiH-O-\left[-Si(CH_3)_2-O-\right]_9\left[-Si(CH_3)(C_6H_5)-O-\right]_9-SiH(CH_3)_2$$

We claim:
1. Process for the preparation of a linear organopolysiloxane having a viscosity less than 100 centistokes at 25° C. which comprises contacting a cyclic organopolysiloxane, alone or in admixture with an α,ω-dihydroxyorganopolysiloxane, with a monohalogeno organosilane in the presence of ferric chloride, and hydrolysing the product obtained.

2. Process according to claim 1, wherein the cyclic organopolysiloxane is of the formula:

$$-\left[-SiR^1R^2-O-\right]_p-$$

where $p$ is 3 to 10, optionally in admixture with an α,ω-dihydroxyorganopolysiloxane consisting of units of the formula:

$$-\left[-SiR^1R^2-O-\right]-$$

the halogeno organosilane is of the formula:

$$R_3SiX$$

(alone or in admixture with a second halogeno organosilane of formula $R'_3SiX$), and the product is of the formula:

$$R_3Si-O-\left[-SiR^1R^2-O-\right]_n-SiR'_3$$

where R, R', $R^1$ and $R^2$ are each hydrogen or a saturated or olefinically or aromatically unsaturated, substituted or unsubstituted hydrocarbon group, X is halogen, $n$ is 1 to 100, and each of the terminal silicon atoms in the polysiloxane chain carries at most two hydrogen atoms.

3. Process according to claim 2, wherein R and R' are each hydrogen, alkyl of 1 to 4 carbon atoms, alkenyl of 2 to 4 carbon atoms, or cyanoalkyl of 2 to 5 carbon atoms, $R^1$ and $R^2$ are each alkyl of 1 to 4 carbon atoms or phenyl, X is chlorine, and $n$ is 4 to 40.

4. Process according to claim 1, wherein enough of a dihalogenosilane is added to the initial reaction mixture to eliminate any water present and, if necessary, reduce the freezing point of the mixture to below the desired reaction temperature.

5. Process according to claim 4, wherein the dihalogenosilane is of the formula:

$$R^1R^2SiX_2$$

where $R^1$ and $R^2$, are each hydrogen or a saturated or olefinically or aromatically unsaturated, substituted or unsubstituted hydrocarbon group, and X is halogen.

6. Process according to claim 1, wherein the reaction is effected at −25° to +30° C.

7. Process according to claim 1, wherein the amount of catalyst used is 0.5 to 5% based on the weight of the cyclic organopolysiloxane and, if present, the α,ω-dihydroxyorganopolysiloxane.

References Cited

UNITED STATES PATENTS 3,234,179  2/1966  Katchman et al. _ 260—448.2 XR
3,274,154  8/1966  Kendrick et al. __ 260—448.2 XR TOBIAS E. LEVOW, *Primary Examiner*.

J. P. PODGORSKI, *Assistant Examiner*.

U.S. Cl. X.R.

260—46.5